(12) United States Patent
Kalamatianos et al.

(10) Patent No.: US 12,175,073 B2
(45) Date of Patent: Dec. 24, 2024

(54) REUSING REMOTE REGISTERS IN PROCESSING IN MEMORY

(71) Applicant: Advanced Micro Devices, Inc., Santa Clara, CA (US)

(72) Inventors: John Kalamatianos, Boxborough, MA (US); Varun Agrawal, Boxborough, MA (US); Niti Madan, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/139,496

(22) Filed: Dec. 31, 2020

(65) Prior Publication Data

US 2022/0206685 A1  Jun. 30, 2022

(51) Int. Cl.
*G06F 3/06*  (2006.01)
(52) U.S. Cl.
CPC .......... *G06F 3/0604* (2013.01); *G06F 3/0659* (2013.01); *G06F 3/0679* (2013.01)
(58) Field of Classification Search
CPC .... G06F 3/0604; G06F 3/0659; G06F 3/0679; G06F 12/02; G06F 3/061; G06F 12/0866;
(Continued)

(56) References Cited

U.S. PATENT DOCUMENTS

| 8,151,037 B1* | 4/2012 | Zhou | G06F 3/0656 |
| | | | 711/111 |
| 2017/0060588 A1* | 3/2017 | Choi | G06F 15/80 |

(Continued)

OTHER PUBLICATIONS

Islam, et al., "Improving Node-Level MapReduce Performance using Processing-in-Memory Technologies", European Conference on Parallel Processing, 12 pages, https://csrl.cse.unt.edu/kavi/Research/UCHPC-2014.pdf. [Retrieved Mar. 29, 2021].

(Continued)

*Primary Examiner* — Khoa D Doan
*Assistant Examiner* — Tong B. Vo
(74) *Attorney, Agent, or Firm* — Kowert, Hood, Munyon, Rankin & Goetzel, P.C.; Rory D. Rankin

(57) ABSTRACT

Systems, apparatuses, and methods for reusing remote registers in processing in memory (PIM) are disclosed. A system includes at least a host processor, a memory controller, and a PIM device. When the memory controller receives, from the host processor, an operation targeting the PIM device, the memory controller determines whether an optimization can be applied to the operation. The memory controller converts the operation into N PIM commands if the optimization is not applicable. Otherwise, the memory controller converts the operation into a N−1 PIM commands if the optimization is applicable. For example, if the operation involves reusing a constant value, a copy command can be omitted, resulting in memory bandwidth reduction and power consumption savings. In one scenario, the memory controller includes a constant-value cache, and the memory controller performs a lookup of the constant-value cache to determine if the optimization is applicable for a given operation.

20 Claims, 8 Drawing Sheets

(58) Field of Classification Search
CPC ......... G06F 15/7821; G06F 2212/1021; G06F 3/0656; G06F 3/0658; G06F 11/2071; G06F 11/2087; G06F 13/1668; G06F 13/1694; G06F 13/1673; G06F 2212/312; G06F 9/3001; G06F 9/383; G06F 9/30167; G06F 12/0888
See application file for complete search history.

(56) References Cited

U.S. PATENT DOCUMENTS

| | | | | |
|---|---|---|---|---|
| 2017/0287101 | A1* | 10/2017 | Flordal | G06T 11/40 |
| 2018/0322065 | A1* | 11/2018 | Yaroshevich | G06F 9/3017 |
| 2020/0110705 | A1* | 4/2020 | Jo | G06F 9/30101 |
| 2020/0175741 | A1* | 6/2020 | Gierach | G06T 1/20 |
| 2020/0319923 | A1* | 10/2020 | Ro | G06F 3/064 |
| 2020/0356305 | A1* | 11/2020 | Kim | G06F 3/0604 |
| 2021/0191624 | A1* | 6/2021 | Zawodny | G06F 15/7821 |
| 2023/0236836 | A1* | 7/2023 | Lee | G06F 9/30145 |
| | | | | 712/208 |

OTHER PUBLICATIONS

Nyasulu, Peter M., "System Design for a Computational-RAM Login-In-Memory Parallel Processing Machine", PhD Thesis, May 1999, 196 pages, https://central.bac-lac.gc.ca/.item?id=NQ42803&op=pdf&app=Library&oclc_number=1006659158. [Retrieved Mar. 29, 2021].

Pugsley, et al. "Analyzing the impact of 3D-stacked Memory+Logic Devices on MapReduce Workloads", 2014 IEEE International Symposium on Performance Analysis of Systems and Software (ISPASS), Mar. 2014, pp. 190-200, https://www.researchgate.net/publication/269302127_NDC_Analyzing_the_impact_of_3D-stacked_memorylogic_devices_on_MapReduce_workloads/link/5c88489fa6fdcc38174f961e/download. [Retrieved Mar. 29, 2021].

Yang et al., "A Processing-in-Memory Architecture Programming Paradigm for Wireless Internet-of-Things Applications", Sensors Journal, Jan. 2019, 23 pages, https://pdfs.semanticscholar.org/81cd/bda211fd479c23de2213fb610b484548cb01.pdf?_ga=2.58956461.1037489400.1617057589-1017129252.1617057589. [Retrieved Mar. 29, 2021].

\* cited by examiner

REUSING REMOTE REGISTERS IN PROCESSING IN MEMORY

BACKGROUND

Description of the Related Art

Computer systems are incorporating more complex memory devices, as well as large numbers and diverse types of memory devices, to cope with ever increasing data storage and performance requirements. One type of computer system may include a hybrid memory cube (HMC) of stacked memory dies, while other types of computer systems using other types of memory devices are also contemplated. Various types of memory devices may be utilized in these computer systems, including random-access memory (RAM), static RAM (SRAM), dynamic RAM (DRAM), high-speed complementary metal-oxide semiconductor (CMOS), high-density DRAM, embedded DRAM (eDRAM), 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for reusing remote registers in processing in memory (PIM) are disclosed herein. In one implementation, a system includes at least a host and a PIM device. Kernels processed in memory often require using the same values as input operands to computations performed inside the dynamic random-access memory (DRAM) die. In order to avoid consuming bandwidth on the host-DRAM interface to communicate these values to PIM before issuing a new command, the host (e.g., memory controller) includes a control unit that allows the reuse of the temporary PIM storage holding these values, therefore saving dynamic energy and bandwidth.

In one implementation, when a memory controller receives, from a host processor, an operation targeting a PIM device, the memory controller determines whether an optimization can be applied to the operation. The memory controller converts the operation into two PIM commands if the optimization is not applicable. Otherwise, the memory controller converts the operation into a single PIM command if the optimization is applicable. For example, if the operation involves reusing a constant value, a copy command needed to copy the constant value to a register located in the PIM device, can be omitted, resulting in memory bandwidth reduction and power consumption savings. In one scenario, the memory controller includes a constant-value cache, and the memory controller performs a lookup of the constant-value cache to determine if the optimization is applicable for a given operation.

Figure 1:
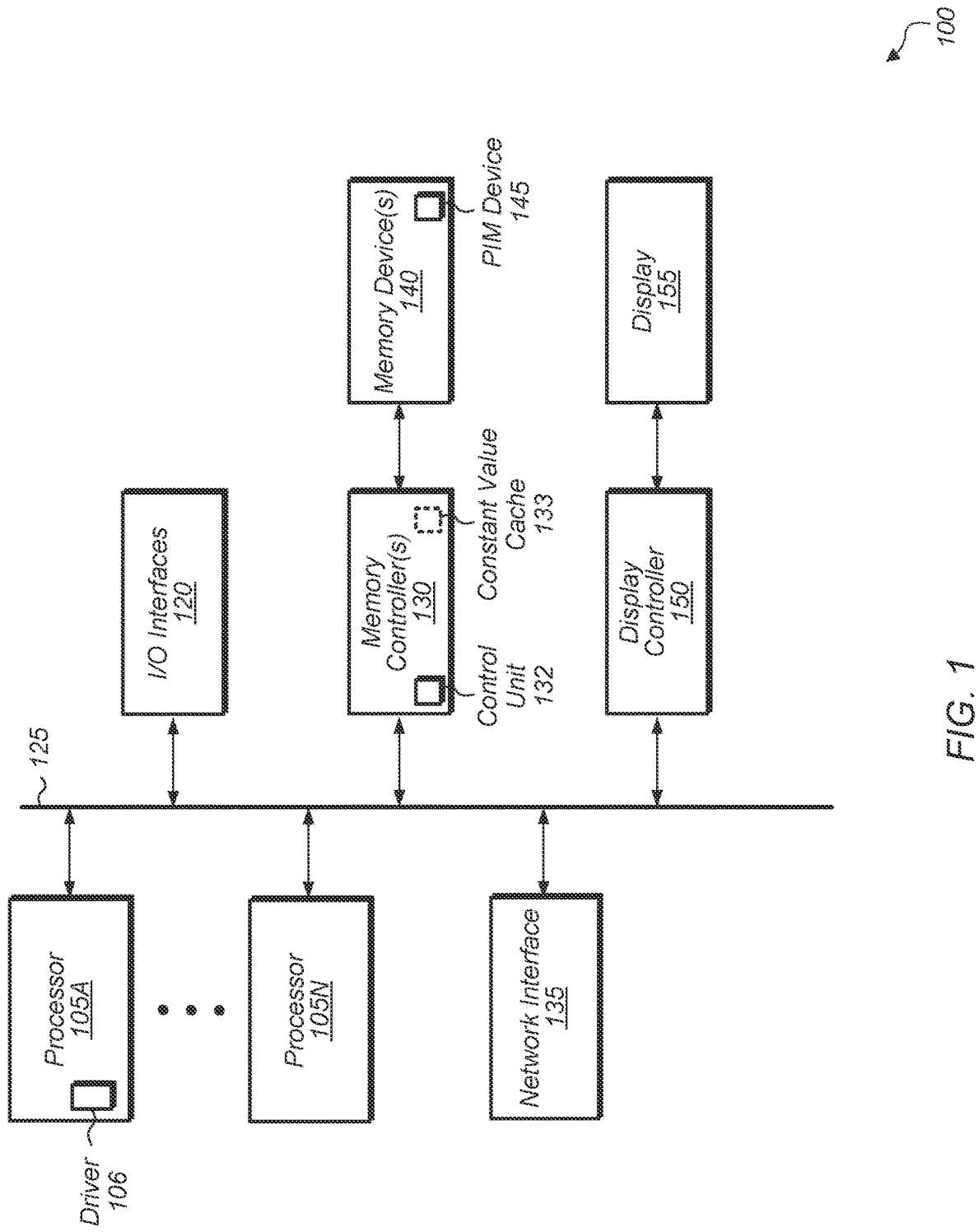
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. The components of system 100 are connected together via bus 125 which is representative of any number and type of interconnects, links, fabric units, buses, and other connectivity modules.

Processors 105A-N are representative of any number of processors which are included in system 100. In one implementation, processor 105A is a general-purpose processor, such as a central processing unit (CPU). In this implementation, processor 105A executes a driver 106 (e.g., graphics driver) for controlling the operation of one or more of the other processors in system 100. It is noted that depending on the implementation, driver 106 can be implemented using any suitable combination of hardware, software, and/or firmware.

In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N.

Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND flash memory, NOR flash memory, Ferroelectric Random Access Memory (FeRAM), or others. In one implementation, a given memory device 140 includes a processing in memory (PIM) device 145. In one implementation, each memory controller 130 includes a control unit 132 and optional constant value cache 133. Control unit 133 tracks the usage of frequently used variables by kernels executing on PIM device 145 and reuses these variables across computations by avoiding any explicit commands to load the variables to PIM device 145. As used herein, the term "kernel" is defined as a function or program containing any number of instructions.

In one implementation, the PIM computational unit in PIM device 145 uses local registers to hold intermediate results from computations sent to PIM device 145 by the host. Each PIM command can execute operations on any of the following sources: a column of the DRAM row, a local PIM register, or a scalar value provided by the host. The destination of a PIM command can be a column of a DRAM row or a local PIM register. This information is passed from the host memory controller 130 to the PIM computational unit via explicit commands. So for example, if the memory controller 130 wants to schedule an add operation on the PIM computational unit where one of the operands comes from a local PIM register, memory controller 130 has to first copy the value to the PIM register via an explicit copy command and then schedule the add operation with the PIM register as one of the source operands. This consumes bandwidth unnecessarily if the value is reused across different instances of the same computation that is offloaded to the PIM computational unit.

In one implementation, memory controller 130 includes constant value cache (CVC) 133. In one implementation, CVC 133 is a table where each entry holds the value of a variable, which is assumed to be reused during the execution of a kernel. In one implementation, the values in CVC 133 are searched using a dedicated content-addressable memory (CAM). When a PIM instruction uses a value as a source operand, CVC 133 is searched for a match. If there is no match, the memory controller 130 copies the value to a local register in PIM device 145 via an explicit copy command. Otherwise, if there is a match in CVC 133, the same PIM register where the value has been stored is reused, avoiding the extra copy command and thus saving bandwidth. Upon a CVC miss, the memory controller 130 may decide to allocate a new CVC entry and track the new value. This will replace an existing value. Replacement can be implemented using any known policy (e.g., least recently used (LRU), random).

A PIM kernel can execute multiple times, and each execution instance is referred to as a "PIM transaction". In one implementation, the instructions within a PIM transaction are issued to the PIM device 145 in program order. Inside a transaction, a local PIM register may be assigned to only one value for the duration of a transaction and thus the PIM kernel. In one implementation, software tags the beginning and end of each PIM kernel via special instructions. In one implementation, upon issuing an instruction that ends a PIM kernel, the contents of CVC 133 are reset. This is because different PIM kernels execute different code where the same value can be in a different PIM register. Therefore, if the CVC 133 tried to reuse the same value from a different kernel by bypassing the explicit copy command, the wrong value may be read because the actual command to be executed on PIM device 145 may use a different register. To prevent this scenario from occurring, in one implementation, the core and thread identifier (ID) is stored in CVC 133 to distinguish reused values based on the hardware thread that initiated the PIM request.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
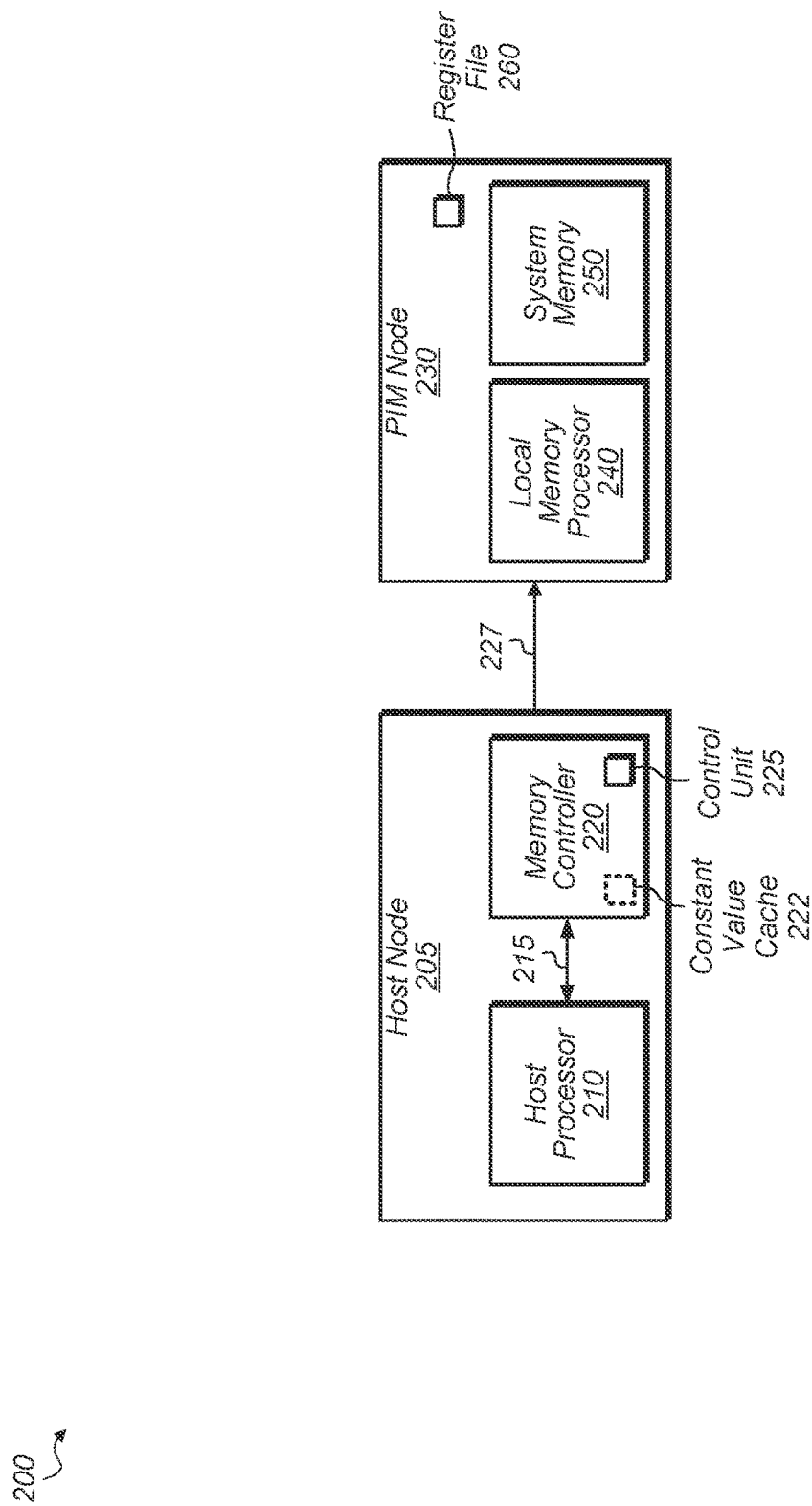
FIG. 2 is a block diagram of one implementation of a computing system.

Turning now to FIG. 2, a block diagram illustrating one implementation of a computer system 200 is shown. Computer system 200 includes host node 205 connected to processing-in-memory (PIM) node 230. It is noted that depending on the implementation, host node 205 and PIM node 230 can be located on separate integrated circuits (ICs) (i.e., chips) or host node 205 and PIM node 230 can be located on a single chip. For example, in one implementation, host node 205 and PIM node 230 are integrated together on a single system on chip (SoC). Host node 205 is coupled to PIM node 230 using any of various types of interconnect protocols over interface 227. In other implementations, host node 205 can be connected to a plurality of PIM nodes. As used herein, a node may be defined as a computing device or computing system with one or more processing elements (e.g., CPU, GPU, programmable logic) and one or more memory devices.

Host node 205 includes host processor 210 which can be any type of processor with any number of cores. In one implementation, host processor 210 executes the main control software of computer system 200, such as an operating system. Generally, software executed by host processor 210 during use controls the other components of host node 205 to realize the desired functionality of host node 205. Host processor 210 also executes other software, such as application programs. The application programs provide user functionality and rely on the operating system for lower level device control.

Host processor 210 is coupled to memory controller 220 via interface 215. In one implementation, memory controller 220 includes control unit 225 and optional constant-value cache 222 for performing PIM optimizations to kernels sent for execution to PIM node 230. In one implementation, the PIM optimization involves reusing registers in register file 260 rather than copying values from host node 205 to PIM node over memory interface 227. This helps to reduce memory bandwidth utilization and lower power consumption. In one implementation, control unit 225 converts PIM operations into PIM commands that avoid copying at least portion of data values across interface 227. For example, when executing a loop that performs an operation on a fixed data value, the fixed data value is stored in a register in register file 260 and accessed on multiple iterations of the loop. This type of loop is common when performing batch normalization operations, rectified linear unit operations, and when performing other types of operations.

In one implementation, PIM node 230 includes local memory processor 240 and system memory 250, which is representative of any number and type of memory devices. In one implementation, PIM node 230 has a PIM architecture, which is a concept of adding computational capabilities near memory. The benefits of this architecture include reduced latency and energy consumption associated with data-movement between cache and memory hierarchy. In other implementations, an accelerator or other computational unit is coupled to host processor 210 and provides similar functionality to that of PIM node 230. Accordingly, throughout this disclosure, when an implementation is described as including a PIM node or a PIM device, it should be understood that this PIM node/device can be replaced with an accelerator or other computational unit in other implementations. In other words, the techniques described herein can be implemented with PIM nodes, accelerators, or other computational devices.

In one implementation, some number of SRAM registers are utilized as a register file 260. In another implementation, PIM node 230 includes a small region of system memory 210 to use as a register file 260. In one implementation, operations performed by PIM node 230 are optimized by reusing values stored in the registers rather than copying data from host node 205 to PIM node 230. Various examples of how to implement this optimization will be provided throughout the remainder of this disclosure.

Computer system 200 may correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, storage device, a peripheral device such as a switch, modem, router, etc., or in general any type of computing device.

Figure 3:
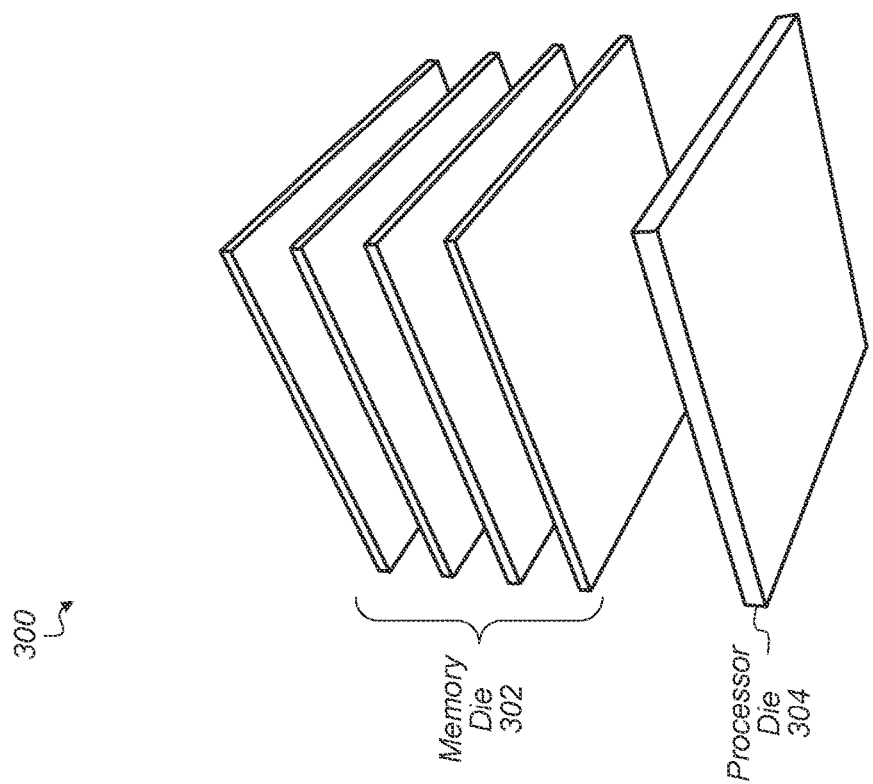
FIG. 3 is a block diagram of one implementation of a PIM node.

Referring now to FIG. 3, a block diagram of one implementation of a PIM node 300 is shown. In one implementation, PIM node 300 includes a vertical die stack of memory die 302 and processor die 304. Memory die 302 includes a stacked memory device wherein the stacked die implement memory circuitry, such as DRAM, SRAM, ROM, and the like. Processor die 304 implements hard-wired logic and routing logic for accessing the memory circuitry of the stacked memory die 302. PIM node 300 can be fabricated using any of a variety of 3D integrated circuit fabrication processes.

In one implementation, processor die 304 and memory die 302 are constructed as separate substrates (e.g., bulk silicon) with active devices and one or more metal routing layers formed at an active surface. This approach can include a wafer-on-wafer process whereby a wafer comprising a matrix of die is fabricated and thinned, and through-silicon vias (TSVs) are etched through the bulk silicon. Multiple wafers are then stacked to achieve the illustrated layer configuration (e.g., a stack of four wafers comprising memory circuitry die for the four memory layers and a wafer comprising the logic die for the processor layer), aligned, and then joined via thermocompression. The resulting stacked wafer set is singulated to separate the individual 3D IC device. In other implementations, other techniques for fabricating PIM node 300 can be utilized.

In one implementation, processor die 304 includes a DRAM memory controller which is coupled to the stacked memory die 302 via TSVs. The memory controller performs memory accesses to the data stored in the storage cell circuitry of the stacked DRAM memory devices in response to memory access requests from one or more processor cores or processing elements on processor die 304. It is noted that in other implementations, other configurations and structures of PIM nodes may be utilized.

Figure 4:
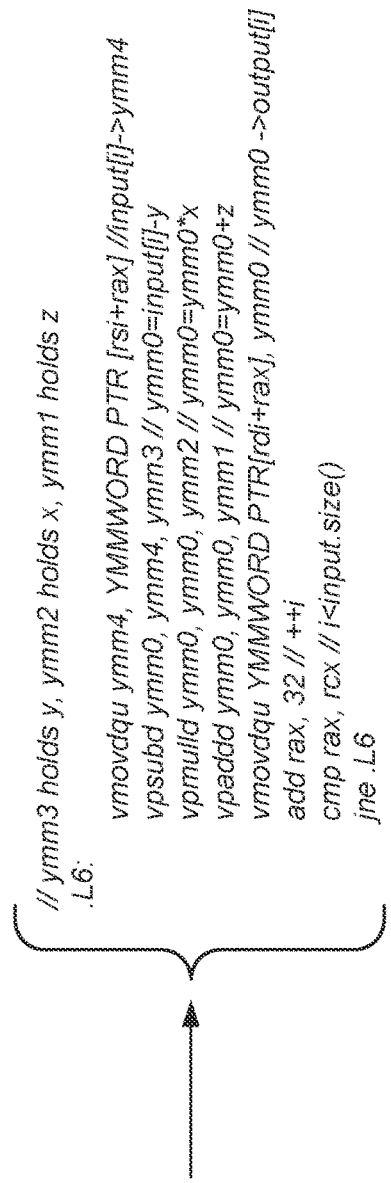
FIG. 4 illustrates an example of one implementation of batch normalization (BN) kernel.

Turning now to FIG. 4, an example of one implementation of batch normalization (BN) kernel 400 is shown. The instructions of BN kernel 400 are an example of code that is executed during inference tasks of convolutional neural networks (CNNs). The BN kernel is shown on the left (in C++) and the equivalent x86 assembly code is shown on the right assuming advanced vector extensions (AVX)-256 support generated by the GNU compiler collection (GCC) 9.2 release. In this example, the BN kernel consists of a loop that executes a set of vector instructions of a computational task and some scalar instructions to manage the loop. The vector instructions of the BN kernel can be translated into a plurality of PIM requests, with one example of a plurality of PIM requests shown in FIG. 5.

Figure 5:
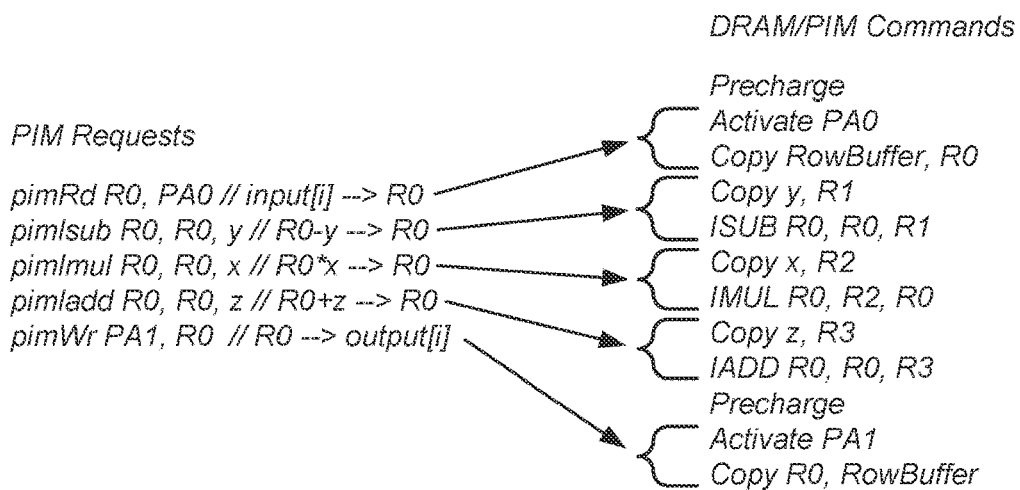
FIG. 5 illustrates two examples of PIM requests being converted into DRAM/PIM commands.
Figure 5:
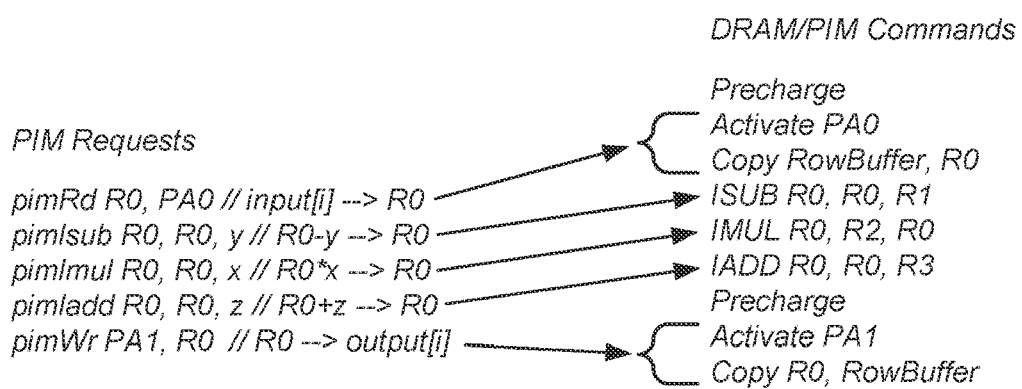

Referring now to FIG. 5, two examples of PIM requests being converted into DRAM/PIM commands are shown. At the top of FIG. 5, example 500 involves converting a group of PIM requests to DRAM/PIM commands to be executed on a PIM device. The values x, y, and z remain the same across the N kernel iterations. However, the memory controller loads the x, y, and z values into PIM registers (via the DRAM command "Copy Value, Rx") on every iteration, therefore consuming host-DRAM bandwidth and dynamic energy.

Example 505 at the bottom of FIG. 5 illustrates an optimization for the same group of PIM requests shown on the left-side. In this optimization, the constant-value cache tracks the values of x, y, and z and enables the bypassing of the corresponding "Copy" DRAM commands. Each time a PIM request with a value arrives at the memory controller, the constant-value cache is searched for that value. Assuming the constant-value cache has enough capacity to hold the values of x, y, and z from the previous iterations of the kernel, the constant-value cache search results in a hit. A constant-value cache hit prompts the memory controller to bypass the DRAM command "Copy Value, Rx" for the PIM request holding the value. In the case of example 505, the optimization saves three DRAM commands and results in a kernel execution of nine DRAM commands as opposed to 12 DRAM commands for example 500.

Figure 6:
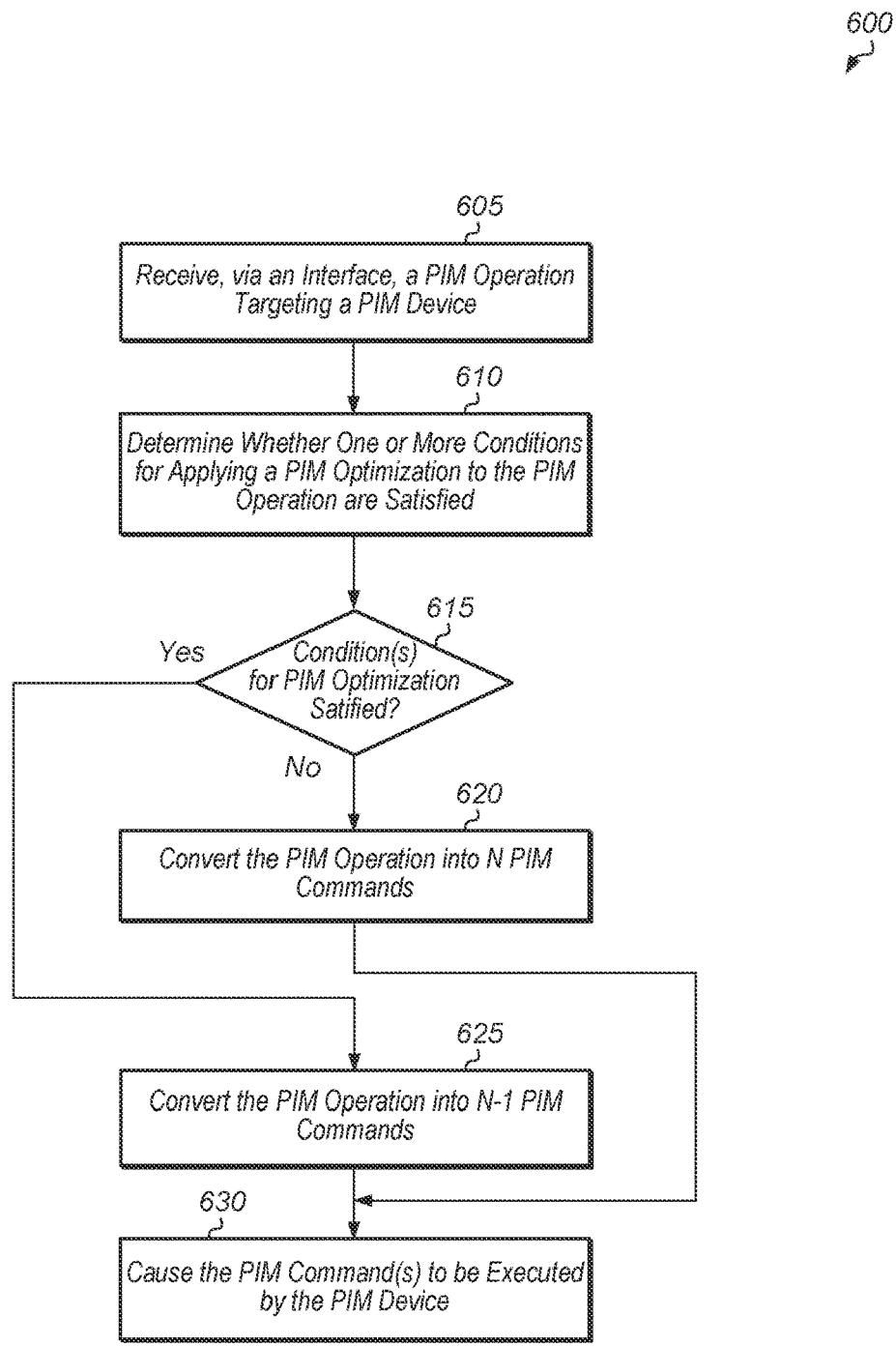
FIG. 6 is a generalized flow diagram illustrating one implementation of a method for optimizing the conversion of PIM operations.
Figure 7:
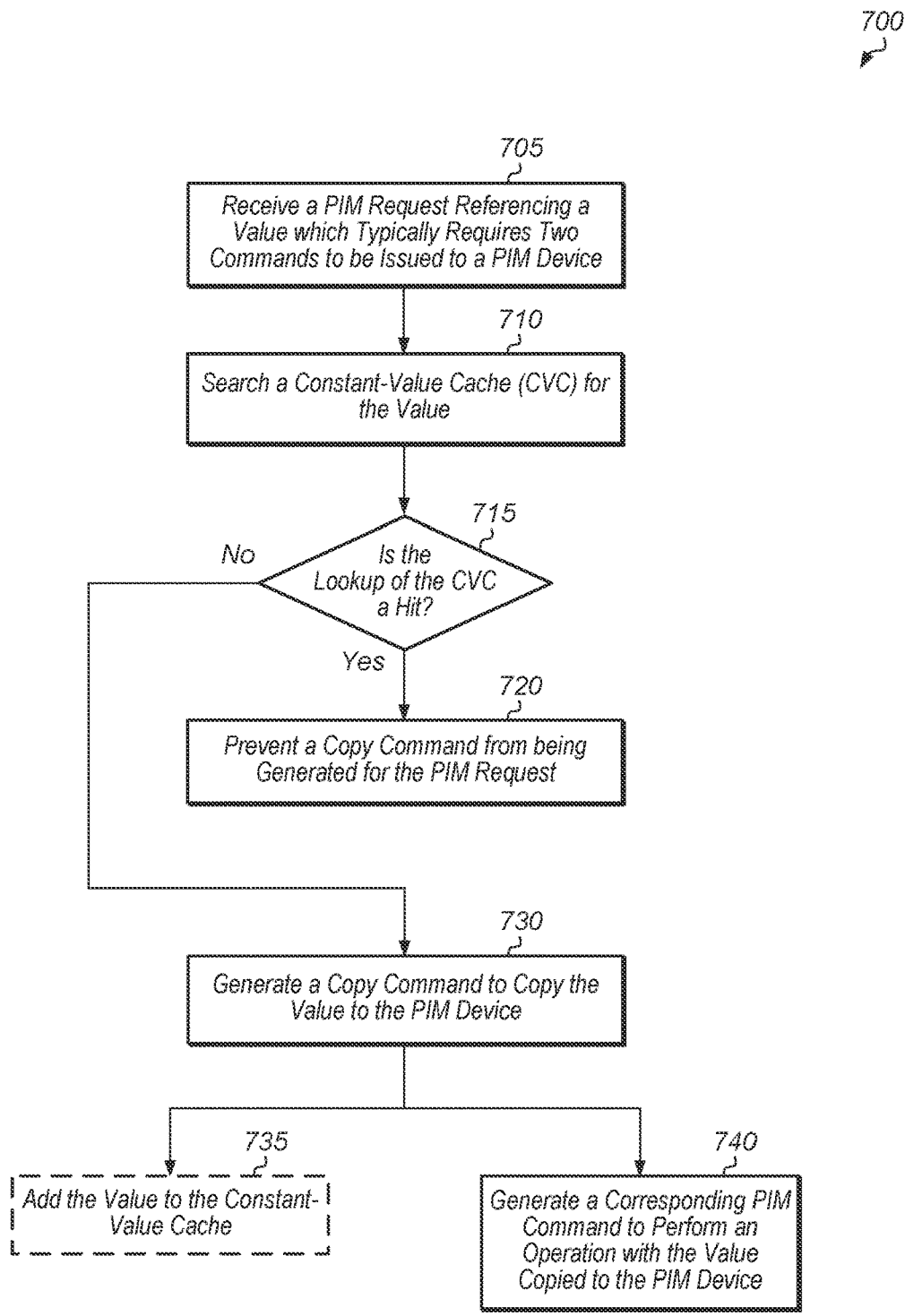
FIG. 7 is a generalized flow diagram illustrating one implementation of a method for employing a constant-value cache.
Figure 8:
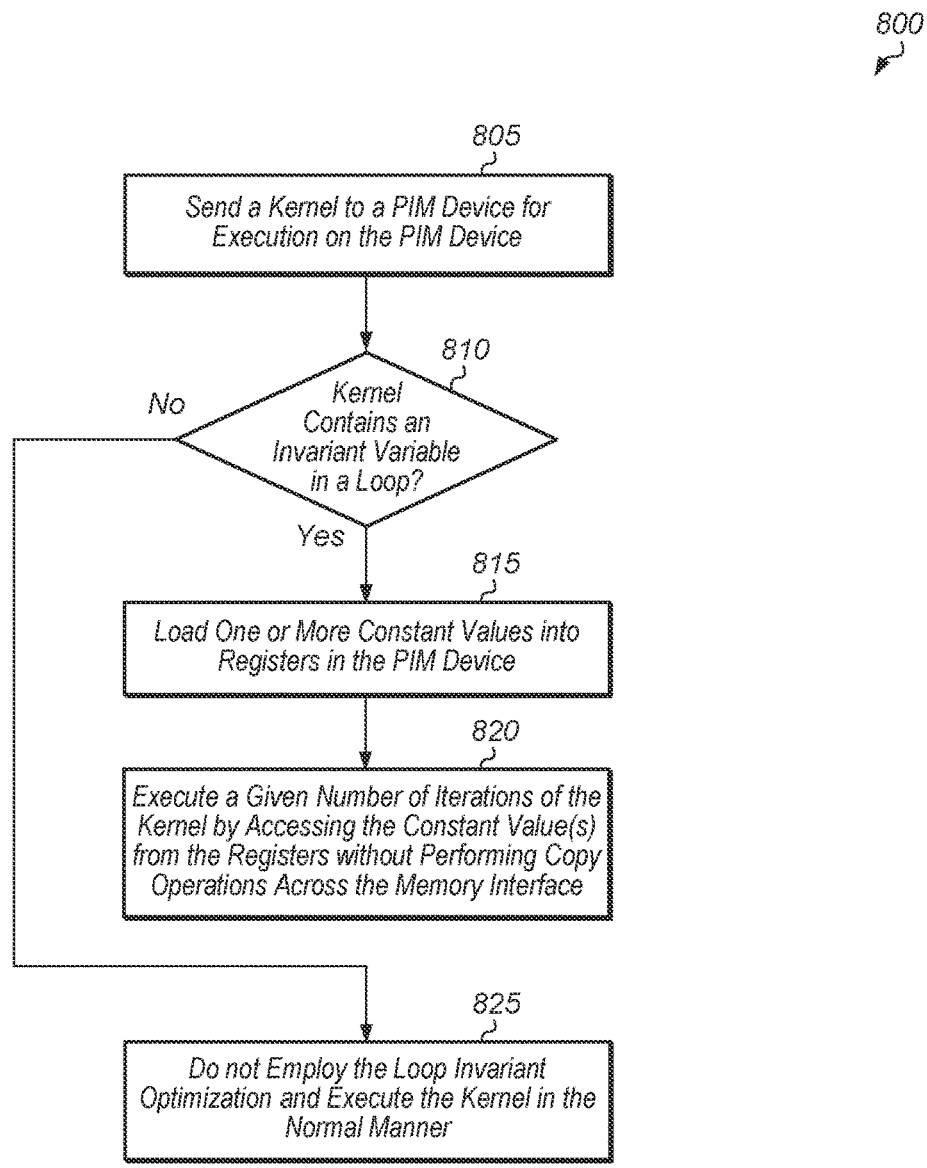
FIG. 8 is a generalized flow diagram illustrating one implementation of a method for executing a kernel on a PIM device.

Turning now to FIG. 6, one implementation of a method 600 for optimizing the conversion of processing in memory (PIM) operations is shown. For purposes of discussion, the steps in this implementation and FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A control unit receives, via an interface, a processing in memory (PIM) operation targeting a PIM device (block 605). In one implementation, the control unit is located in a memory controller. In other implementations, the control unit resides in other locations. In one implementation, the PIM operation is received from a host processor, and the interface is a connection to the host processor. In other implementations, the PIM operation is received from other sources.

Next, the control unit determines whether one or more conditions for applying a PIM optimization to the PIM operation are satisfied (block 610). In one implementation, the one or more conditions include the PIM operation targeting a constant value. In another implementation, the one or more conditions include the PIM operation targeting a value that is already stored in a register on the PIM device. In a further implementation, the one or more conditions include a constant value cache lookup for the targeted value resulting in a hit. In a still further implementation, the one or more conditions include the PIM operation being called by a kernel that invokes an invariant inside a loop. In other implementations, other conditions can be used to determine whether to apply the PIM optimization to the PIM operation.

If the one or more conditions for applying the PIM optimization to the PIM operation are not satisfied (conditional block 615, "no" leg), then the control unit converts the PIM operation into N PIM commands (block 620). It is assumed for the purposes of this discussion that "N" is a positive integer greater than one. In one implementation, the N PIM commands include a copy command and an arithmetic command.

If the one or more conditions for applying the PIM optimization to the PIM operation are satisfied (conditional block 615, "yes" leg), then the control unit converts the PIM operation into N−1 PIM commands (block 625). In one implementation, one of the N−1 PIM commands is an arithmetic operation using a constant value. The copy command is not generated in this case, which is the PIM optimization. By not generating the copy command, memory bandwidth is saved and power consumption is reduced. After blocks 620 and 625, the control unit causes the PIM command(s) to be executed by the PIM device (block 630). After block 630, method 600 ends.

Referring now to FIG. 7, one implementation of a method 700 for employing a constant-value cache is shown. A memory controller receives a PIM request referencing a value which typically requires two commands to be issued to a PIM device (block 705). In response to receiving the PIM request referencing the value, the memory controller searches a constant-value cache for the value (block 710). If the lookup of the constant-value cache (CVC) is a hit (conditional block 715, "yes" leg), then the memory controller prevents a copy command from being generated for the PIM request (block 720). This optimization saves memory bandwidth and power consumption by not performing a copy command to copy the value to the PIM device. After block 720, method 700 ends.

If the lookup of the constant-value cache is a miss (conditional block 715, "no" leg), then the memory controller generates a copy command to copy the value to the PIM device (block 730). Also, the memory controller optionally adds the value to the constant-value cache (block 735). Still further, the memory controller generates a corresponding PIM command to perform an operation with the value copied to the PIM device (block 740). After blocks 735 and 740, method 700 ends.

Turning now to FIG. 8, one implementation of a method 800 for executing a kernel on a PIM device is shown. A kernel is sent to a PIM device for execution on the PIM device (block 805). In response to the kernel being sent to the PIM device for execution, a determination is made as to whether the kernel contains an invariant variable in a loop (conditional block 810). In one implementation, the determination is made by a memory controller. In another implementation, the determination is made by a compiler. In other implementations, other entities can make the determination in conditional block 810.

If the kernel contains an invariant variable in the loop (conditional block 810, "yes" leg), then the memory controller loads one or more constant values into registers in the PIM device (block 815). The kernel then executes a given number of iterations by accessing the constant value(s) from the registers without performing copy operations across the memory interface (block 820). This optimization saves memory bandwidth and reduces power consumption. After block 820, method 800 ends. Otherwise, if the kernel does not contain an invariant variable in the loop (conditional block 810, "no" leg), then the loop invariant optimization is not employed and the kernel executes in the normal manner (block 825). After block 825, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MO such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory controller comprising circuitry configured to:
   access a cache responsive to receipt of an operation targeting a processing device, wherein the operation references a value;
   convert the operation into at least two commands that include a memory access command and an arithmetic command, responsive to the value not being in the cache; and convert the operation into one or more commands that exclude the memory access command and include the arithmetic command, responsive to the value being in the cache.

2. The apparatus as recited in claim 1, wherein converting the operation into one or more commands that exclude the memory access command causes a reduction in a number of commands that are executed by the processing device.

3. The apparatus as recited in claim 1, wherein the operation targeting the processing device is a processing in memory command.

4. The apparatus as recited in claim 1, wherein the one or more commands that exclude the memory access command comprise only the arithmetic command.

5. The apparatus as recited in claim 1, wherein;
the cache is a constant value cache configured to track values used by requests targeting the processing device; and
the circuitry is configured to store a core identifier and a thread identifier in each of a plurality of entries of the constant value cache.

6. The apparatus as recited in claim 5, wherein, responsive to an instruction that ends a kernel, the circuitry is configured to reset entries of the plurality of entries storing a core identifier and a thread identifier corresponding to the kernel.

7. The apparatus as recited in claim 1, wherein the processing device is a processing in memory (PIM) device, and wherein the cache stores the value, responsive to the operation being called by a kernel that invokes a loop with using the value as an invariant variable.

8. A method comprising:
accessing, by circuitry of a control unit of a memory controller, a cache responsive to receipt of an operation targeting a processing device, wherein the operation references a value;
converting, by the control unit of the memory controller, the operation into at least two commands that include at least one memory access command and an arithmetic command, responsive to the value not being in the cache; and
converting the operation into one or more commands that exclude the memory access command and include the arithmetic command, responsive to the value being in the cache.

9. The method as recited in claim 8, wherein converting the operation into one or more commands that exclude the memory access command causes a reduction in a number of commands that are executed by the processing device.

10. The method as recited in claim 8, wherein the operation targeting the processing device is a processing in memory command.

11. The method as recited in claim 8, wherein the one or more commands that exclude the memory access command comprise only the arithmetic command.

12. The method as recited in claim 8, further comprising:
tracking values used by requests targeting the processing device by the cache that is a constant value cache; and
storing a core identifier and a thread identifier in each of a plurality of entries of the constant value cache.

13. The method as recited in claim 12, wherein, responsive to an instruction that ends a kernel, the circuitry is configured to reset entries of the plurality of entries storing a core identifier and a thread identifier corresponding to the kernel.

14. The method as recited in claim 8, wherein the processing device is a processing in memory (PIM) device, and wherein the cache stores the value, responsive to the operation being called by a kernel that invokes a loop using the value as an invariant variable.

15. A system comprising:
a processing in memory (PIM) device; and
a memory controller coupled to the PIM device, wherein the memory controller is comprises circuitry configured to:
access a cache responsive to receipt of a PIM operation targeting the PIM device, wherein the PIM operation references a value;
convert the PIM operation into at least two commands that include a memory access command and an arithmetic command, responsive to the value not being in the cache; and
convert the PIM operation into one or more commands that exclude the memory access command and include the arithmetic command, responsive to the value being in the cache.

16. The system as recited in claim 15, wherein converting the PIM operation into one or more commands that exclude the memory access command causes a reduction in a number of commands that are executed by the PIM device.

17. The system as recited in claim 15, wherein the memory controller is configured to prevent a memory access command from being generated for the PIM operation responsive to the value being in the cache.

18. The system as recited in claim 15, wherein the one or more commands that exclude the memory access command comprise only the arithmetic command.

19. The system as recited in claim 15, wherein;
the cache is a constant value cache configured to track values used by requests targeting the PIM device; and
the memory controller is configured to store a core identifier and a thread identifier in each of a plurality of entries of the constant value cache.

20. The system as recited in claim 15 19, wherein, responsive to an instruction that ends a kernel, the circuitry is configured to reset entries of the plurality of entries storing a core identifier and a thread identifier corresponding to the kernel.

* * * * *

UNITED STATES PATENT AND TRADEMARK OFFICE
CERTIFICATE OF CORRECTION

PATENT NO. : 12,175,073 B2
APPLICATION NO. : 17/139496
DATED : December 24, 2024
INVENTOR(S) : Kalamatianos et al.

It is certified that error appears in the above-identified patent and that said Letters Patent is hereby corrected as shown below:

In the Claims

Column 9, Claim 5, Line 15, please delete "claim 1, wherein;" and insert -- claim 1, wherein: --.

Column 9, Claim 7, Line 29 & 30, please delete "a loop with using" and insert -- a loop using --.

Column 10, Claim 15, Line 19, please delete "memory controller is comprises" and insert -- memory controller comprises --.

Column 10, Claim 19, Line 43, please delete "claim 15, wherein;" and insert -- claim 15, wherein: --.

Column 10, Claim 20, Line 49, please delete "recited in claim 15 19" and insert -- recited in claim 19 --.

Signed and Sealed this
Sixth Day of May, 2025

Coke Morgan Stewart
*Acting Director of the United States Patent and Trademark Office*